US007608121B2

(12) United States Patent
Boyer et al.

(10) Patent No.: US 7,608,121 B2
(45) Date of Patent: Oct. 27, 2009

(54) HVAC SYSTEM WITH MOVING FILTER

(75) Inventors: Eugene C. Boyer, El Paso, TX (US); Gregory J Kowalski, Sanborn, NY (US)

(73) Assignee: Delphi Technologies, Inc., Troy, MI (US)

( * ) Notice: Subject to any disclaimer, the term of this patent is extended or adjusted under 35 U.S.C. 154(b) by 234 days.

(21) Appl. No.: 11/505,518

(22) Filed: Aug. 17, 2006

(65) Prior Publication Data

US 2008/0041025 A1    Feb. 21, 2008

(51) Int. Cl.
*B01D 46/00* (2006.01)
(52) U.S. Cl. .......................... 55/282.2; 55/290; 55/302; 55/354; 55/428; 55/467.1
(58) Field of Classification Search .................. 95/277, 95/279, 280, 282, 283; 55/282.2, 282.4, 55/282.5, 290, 295, 297, 296, 354, 418, 428, 55/467.1; 96/429; 180/68.6; 160/DIG. 1, 160/2, 10, 11
See application file for complete search history.

(56) References Cited

U.S. PATENT DOCUMENTS

| 1,327,730 | A | * | 1/1920 | Payne | 165/98 |
|---|---|---|---|---|---|
| 1,358,224 | A | * | 11/1920 | McClain | 160/31 |
| 1,367,031 | A | * | 2/1921 | Fedders | 165/98 |
| 1,404,527 | A | * | 1/1922 | Janssen | 165/98 |
| 1,472,650 | A | * | 10/1923 | Hoffman | 165/98 |
| 1,520,843 | A | * | 12/1924 | Pate | 165/98 |
| 1,771,714 | A | * | 7/1930 | Lawrence | 160/31 |
| 1,818,391 | A | * | 8/1931 | Greene | 55/290 |
| 1,926,629 | A | * | 9/1933 | Nicholson | 237/12.3 B |
| 2,216,986 | A | * | 10/1940 | Roe | 110/165 A |
| 2,246,823 | A | * | 6/1941 | Vollberg et al. | 160/89 |
| 2,254,459 | A | * | 9/1941 | Swanda | 160/239 |
| 2,752,003 | A | * | 6/1956 | Hersey, Jr. et al. | 55/290 |
| 3,309,847 | A | * | 3/1967 | Donaldson | 55/282.4 |
| 3,344,854 | A | * | 10/1967 | Boyajian | 165/119 |
| 3,368,333 | A | * | 2/1968 | Merklin | 55/354 |
| 3,398,511 | A | * | 8/1968 | Gustavsson | 55/290 |
| 4,057,105 | A | * | 11/1977 | Bailey | 165/119 |
| 4,125,147 | A | * | 11/1978 | Bailey | 165/95 |
| 4,521,230 | A | * | 6/1985 | Strong | 96/418 |

(Continued)

FOREIGN PATENT DOCUMENTS

JP    2002-362144    12/2002

OTHER PUBLICATIONS

English language Abstract for JP 2004-362144 extracted from espacenet.com database Jan. 31, 2006.

*Primary Examiner*—Duane Smith
*Assistant Examiner*—Sonji Turner
(74) *Attorney, Agent, or Firm*—Patrick M. Griffin

(57) ABSTRACT

An endless filtering sheet, having an interior entrained about rollers, extends in a path of movement over an air inlet in a housing for receiving air flow and presents an exterior from which dirt and debris collected from the incoming air flow and which dirt and debris is removed in a horizontal reach by gravity and/or an air flow. A drive mechanism continuously moves the sheet in the endless path to provide a continuously operating air filtration system for a heat exchanger in a HVAC system that is self-cleaning.

7 Claims, 3 Drawing Sheets

U.S. PATENT DOCUMENTS

| | | | |
|---|---|---|---|
| 5,445,214 A * | 8/1995 | Han | 165/11.1 |
| 6,390,217 B1 * | 5/2002 | O'Brien et al. | 180/68.6 |
| 6,634,448 B2 | 10/2003 | Bland | |
| 6,843,834 B2 * | 1/2005 | Schumacher | 95/277 |

* cited by examiner

HVAC SYSTEM WITH MOVING FILTER

FIELD OF THE INVENTION

The present invention generally relates to a heating, ventilation and cooling (HVAC) system.

DESCRIPTION OF THE PRIOR ART

The HVAC system (or other cooling systems) typically employed in automotive vehicles (or other vehicles) include a plurality of heat exchangers for heat transfer with air passing threrethrough in different portions of the cycle or mode of operation. A compressor compresses refrigerant for expansion or evaporation. Such systems include condensers, radiators, evaporators, heaters, and the like. Normally, the system includes a housing surrounding one or more of the heat exchangers and defines an air inlet and an air outlet.

The ambient air entering the inlet frequently carries foreign matter, i.e., dirt and debris, in the air stream and such foreign matter lodges in the heat exchanger. Either no special filtration is provided so that the heat exchanger is not protected and or loses performance due to contamination or clogging. In some instances, a simple stationary screen is used (i.e., for condensers or radiators) but requires regular cleaning. Separate or multiple filter cartridges are sometimes used (i.e., for HVAC Heating and Cooling Modules or Systems) that require frequent cleaning and/or replacement due to contamination or plugging with dirt and/or debris.

In order to control air flow through radiators in an automotive vehicle, a sheet of blocking material has been supported on a plurality of rollers in the housing for selectively blocking the flow of air through the heat exchanger. The sheet presents an interior entrained about the rollers and extends in a path of movement over the air inlet and in front of the heat exchanger with an exterior for blocking air flow. Such an air regulating sheet is disclosed in U.S. Pat. No. 6,390,217 to O'Brien et al. and assigned to the assignee of the subject invention. An arrangement for cleaning a heat exchanger is illustrated in Japanese application 2002-362144.

SUMMARY OF THE INVENTION AND ADVANTAGES

The invention provides for the sheet disposed between the air inlet and the heat exchanger and having filtering air passages therethrough permitting air to flow through the sheet as the sheet filters foreign matter from the air flowing through the sheet.

The invention provides an air cleaning system that can catch and also release foreign matter such as dirt or debris that would otherwise contaminate or clog the various types of heat exchangers (HVAC Evaporator and Heater, Condenser, Radiator, etc.) used for cooling purposes. A moving filter sheet comprising a screen or fabric, or other filter material, would catch the dirt or debris in the inlet air stream that is ahead of the heat exchanger. The moving sheet would transport the captured dirt or debris to a cleaning station where it could either drop off (due to no air flow) or be blown off (by reverse direction and/or higher velocity air flow). The physical configuration of the sheet and the heat exchanger can vary based on the air supply scheme that is needed as well as available packaging space. The resulting location for the inlet air and outlet air can be as needed to achieve the best configuration to suit an application. Also the actual screen, fabric or other filtering medium design and material details can be as required to provide the needed filtration and air flow performance for the specific operating conditions and/or environment.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a heating, ventilation and cooling system 20 is shown generally.

Figure 1:
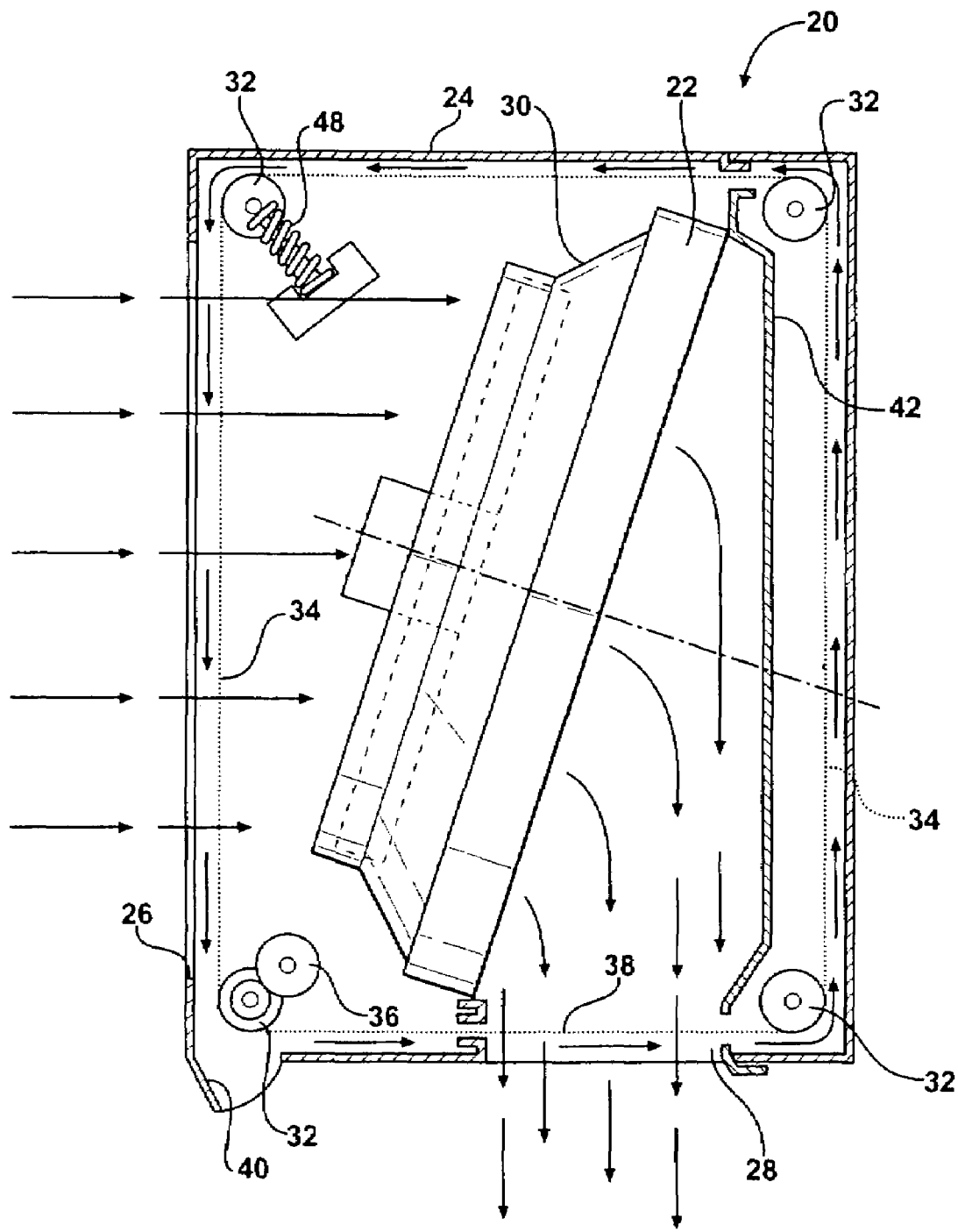
FIG. 1 is a side elevation view of a first embodiment of the subject invention.

The system 20 includes a heat exchanger 22 for heat transfer with air passing there through. More specifically, the heat exchanger 22 could be a radiator or a condenser or a HVAC heat exchanger 22 module. A rectangular housing 24 surrounds the heat exchanger 22 and defines an air inlet 26 and an air outlet 28. As illustrated in FIG. 1, the heat exchanger 22 is disposed at an acute angle to horizontal and vertical planes whereby the air from the air inlet 26 in the vertical front wall of the housing 24 enters horizontally to enter the heat exchanger 22 at an angle to the face of the heat exchanger 22 and flows downwardly to the air outlet 28 in the bottom wall of the housing 24. A fan 30 is included for moving the air into the air inlet 26 and through the screen and through the heat exchanger 22 and out of the air outlet 28.

Figure 3A:
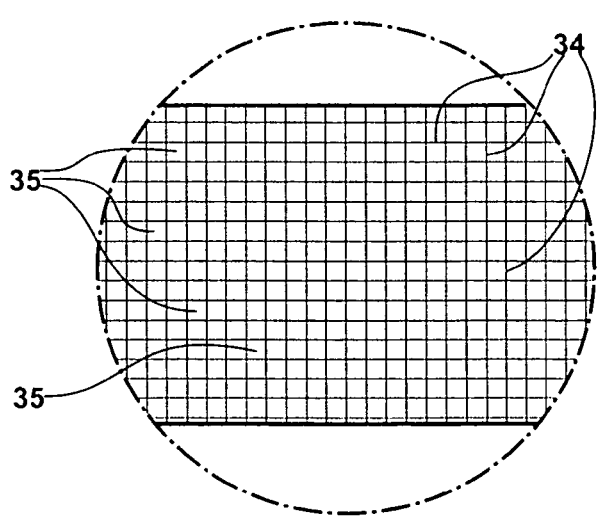
FIG. 3A is an enlarged view of the endless sheet illustrating filtering air passages therethrough.

A plurality of rollers 32 are supported by the housing 24, at the corners of the housing 24 as illustrated in FIG. 1. An endless sheet 34, having an interior entrained about the rollers 32, extends in a path of movement over the air inlet 26 and presents an exterior for receiving air flow. The invention is distinguished by the sheet 34 having filtering air passages 35 therethrough. The filtering air passages 35 permit the air to flow through the sheet 34 as the sheet 34 filters foreign matter from the air flowing through the sheet 34. Referring to FIG. 3A, the sheet 34 and filtering air passages 35 are generically illustrated and this Figure is not to be interpreted as limiting. To this end, the sheet 34 can be a wide variety of different types and is typically defined by woven fabric, a screen, or other filter material to catch the foreign matter, e.g., dirt and debris, in the inlet air stream that enters the air inlet 26 and flows into the heat exchanger 22. As illustrated in FIG. 1, the rollers 32 are spaced about the heat exchanger 22 to establish the endless path of movement of the sheet 34 to surround the heat exchanger 22.

The system 20 includes a drive mechanism 36 for moving the sheet 34 in the path. The drive mechanism 36 is illustrated in FIG. 1 as a drive motor for rotating one of the rollers 32, i.e., the roller 32 in the lower left hand corner of the housing 24. The motor may be an electric gear motor, air motor, hydraulic motor or other power-drive device that provides a low speed high torque source of power (to one or more of the support rollers 32 ) to transport the moving filter/screen sheet 34 or belt at the required speed. The foreign matter including dirt or debris in the air stream from the air inlet 26 will be caught or filtered out by the filter/screen or sheet 34 as the air enters and moves through the moving filter sheet 34. As the sheet 34 moves through the filtering reach and downward, the trapped foreign matter is carried to the adjacent bottom roller 32 where larger foreign matter would likely fall off as the air flow stops when the filter/screen or sheet 34 moves around the forward bottom roller 32. The sheet 34 then continues moving to the adjacent air outlet 28 where any remaining dirt or debris can be blown off due to the higher velocity air that flows from the exit of the heat exchanger 22 and through the filter/screen or sheet 34 in the opposite direction from the interior to the exterior.

Accordingly, the system 20 includes a cleaning station along the path for removing foreign matter from the sheet 34 and that cleaning station may include various combinations of components. Typically, the cleaning station is defined by a pair of the rollers 32 being spaced horizontally to establish a cleaning or horizontal reach 38 of the sheet 34 with the exterior facing downward for removing foreign matter under the force of gravity. As alluded to above, a chute 40 is disposed adjacent a first of the rollers 32 in the horizontal reach 38 for collecting foreign matter released from the sheet 34 as the sheet 34 moves around the first roller 32, i.e., the roller 32 in the bottom left hand corner. The chute 40 provides a clear exit path for debris to drop for collection in an appropriate container.

Figure 2:
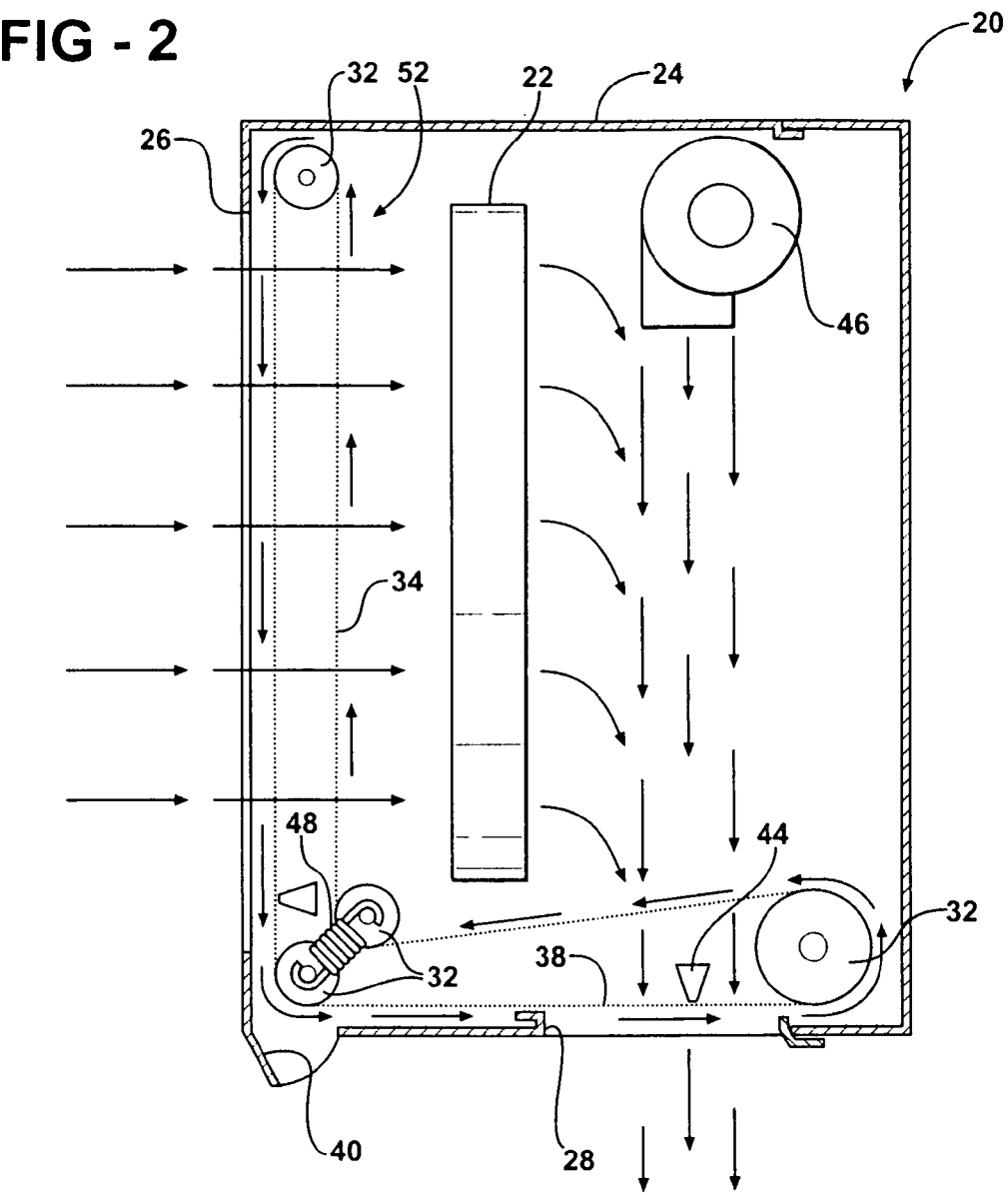
FIG. 2 is a side elevation view of a second embodiment of the subject invention

To positively remove the foreign matter from the filter sheet 34, the cleaning station includes a source of cleaning air for directing cleaning air into the interior of the sheet 34 and out of the exterior of the sheet 34 for removing foreign matter. In one instance the source of cleaning air includes a flow control 42, e.g., a baffle, for directing air exiting the heat exchanger 22 through the cleaning reach of the sheet 34. Alternatively or in addition, the source of cleaning air may include a nozzle 44 as illustrated in FIG. 2 extending across the sheet 34 for directing a linear exhaust of air through the sheet 34 in the cleaning reach of the sheet 34. The nozzle 44 could be supplied air from a blower 46. Yet another variation is to employ a fan 30 that is reversible for removing foreign matter from the sheet 34. This would require a cleaning cycle during which the air flow would be reversed through the sheet 34 in the cleaning station.

Furthermore, the air outlet 28 could be a smaller cross sectional area than the cross sectional area of the air inlet 26 to increase the velocity of the cleaning air flow through the sheet 34 that results in an improved cleaning effect. The location and size/shape of the air inlet 26 and air outlet 28 and the chute 40 can vary as needed to provide the desired air flow and debris management path that is needed for each application.

In the embodiment of FIG. 2, the rollers 32 are disposed in an L-shape in front of and under the heat exchanger 22 to establish the path in overlapping reaches both in front of and under the heat exchanger 22. This configuration facilitates a module supporting the rollers 32 in the L-shape in the housing 24 for easy removal and replacement.

Either embodiment may include a tensioning mechanism 48 or spring for applying a tension to the sheet 34, particularly a sheet 34 that is non-stretchable. On the other hand, a stretchable sheet 34 may be employed that has inherent memory for maintaining the sheet 34 in tension. One or more of the rollers 32 may be eccentric and/or present a variable shape between the ends thereof to enhance the release of the foreign matter. As illustrated in FIG. 2, one of the rollers 32 may have a larger diameter than the rest of the rollers 32 to provide sufficient space for a nozzle 44 or other components.

Figure 3:
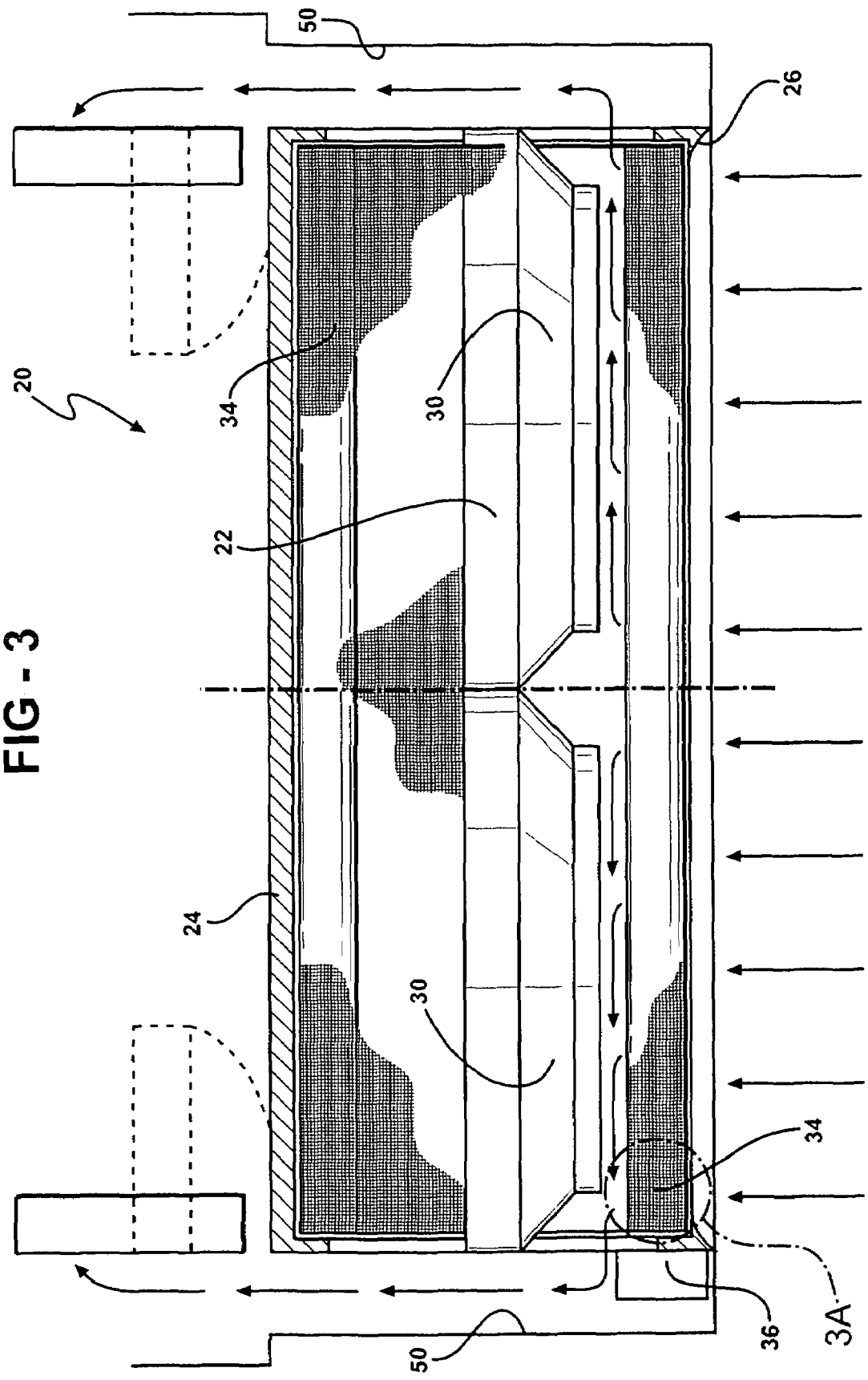
FIG. 3 is a top view showing by-passes for filtered air to flow around the heat exchanger.

As illustrated in FIG. 3, the housing 24 defines a pair of by-passes 50 downstream of the sheet 34 for directing a portion of the air filtered by the sheet 34 around the heat exchanger 22. The by-pass 50 provides the option of using the pre-filtered air inside or down-stream of the filter sheet 34 as a source for filtered air that may be used elsewhere than the heat exchanger 22. In this case, an opening is provided that leads to a secondary air filter cartridge 52 then provides the inlet air for an Air Conditioning (HVAC) Module. This air "take-off" chamber or by-pass 50 passage is shown on sides in FIG. 3, but may be positioned on any of the surrounding walls of the housing 24 depending on the corresponding routing and configuration of the endless sheet 34.

Thus, the moving air filter/screen system 20 provides for a continuously operating air filtration system 20 that is also self cleaning.

Obviously, many modifications and variations of the present invention are possible in light of the above teachings. The invention may be practiced otherwise than as specifically described within the scope of the appended claims.

The invention claimed is:

1. A heating, ventilation and cooling system comprising;
a heat exchanger for heat transfer with air passing there through, wherein said heat exchange has a front face oriented toward oncoming air flow and a bottom edge substantially perpendicular to said front face,
a housing surrounding said heat exchanger and defining an air inlet adjacent to said front face of heat exchanger and an air outlet adjacent to said bottom edge of heat exchanger, wherein said air inlet is larger and than said air outlet,
a plurality of rollers supported by said housing defining an L-shape, wherein the plurality of rollers includes two rollers defining the shorter portion of said L-shape adjacent to said bottom edge of heat exchanger,
an endless sheet having an interior entrained about said rollers and extending in a path of overlapping movement over said air inlet and said outlet, wherein said endless sheet includes a cleaning reach defined by said endless sheet overlapping said two rollers adjacent to said bottom edge of heat exchanger,
a drive mechanism for moving said sheet in said path; and
a flow control for directing air exiting from said heat exchanger through said cleaning reach of said sheet.
said sheet having filtering air passages there through permitting the air to flow through said sheet as said sheet filters foreign matter from the air flowing through said sheet.

2. A system as set forth in claim 1 including a chute disposed adjacent a first of said rollers for collecting foreign matter released from said sheet as the sheet moves around said first roller.

3. A system as set forth in claim 1 including a tensioning mechanism for applying a tension to said sheet.

4. A system as set forth in claim 1 including a module supporting said rollers in said L-shape in said housing for removal and replacement.

5. A system as set forth in claim 1 including a fan for moving air into said air inlet and through said sheet and through said heat exchanger and out of said air outlet.

6. A system as set forth in claim 5, wherein said fan is reversible for removing foreign matter from said sheet.

7. A system as set forth in claim 1 wherein said housing defines at least one by-pass downstream of said sheet for directing a portion of the air filtered by said sheet around said heat exchanger.

* * * * *